United States Patent [19]
Murata et al.

[11] Patent Number: 6,091,903
[45] Date of Patent: Jul. 18, 2000

[54] MACRO LENS SYSTEM

[75] Inventors: Masayuki Murata; Takayuki Ito, both of Saitama-ken, Japan

[73] Assignee: Asahi Kogaku Kabushiki Kaisha, Tokyo, Japan

[21] Appl. No.: 09/205,718

[22] Filed: Dec. 4, 1998

[30] Foreign Application Priority Data

Dec. 4, 1997 [JP] Japan ................................ 9-334418

[51] Int. Cl.[7] .................................................. G03B 7/00
[52] U.S. Cl. ................................................ 396/65; 396/505
[58] Field of Search ....................... 396/64, 63, 65, 396/89, 111, 91, 505; 359/823

[56] References Cited

U.S. PATENT DOCUMENTS

| | | | |
|---|---|---|---|
| 4,666,260 | 5/1987 | Itoh | 359/745 |
| 4,772,108 | 9/1988 | Sugiyama | 359/761 |
| 4,923,292 | 5/1990 | Matsuo | 359/754 |
| 4,934,790 | 6/1990 | Hohenecker | 396/89 X |
| 5,331,464 | 7/1994 | Ito et al. | 359/691 |
| 5,850,577 | 12/1998 | Ito | 396/80 |

FOREIGN PATENT DOCUMENTS 61-138912   6/1986   Japan .

*Primary Examiner*—W. B. Perkey
*Attorney, Agent, or Firm*—Greenblum & Bernstein, P.L.C.

[57] ABSTRACT

A macro lens system includes a positive first lens group, an aperture and a negative second lens group arranged in the order from an object side. The lens groups are driven to move along an optical axis for focusing. When the lens groups are driven, a full-opening diameter of the aperture is changed such when the lens groups is moved toward the object side to focus on a closer object, the full-opening diameter is increased.

9 Claims, 14 Drawing Sheets

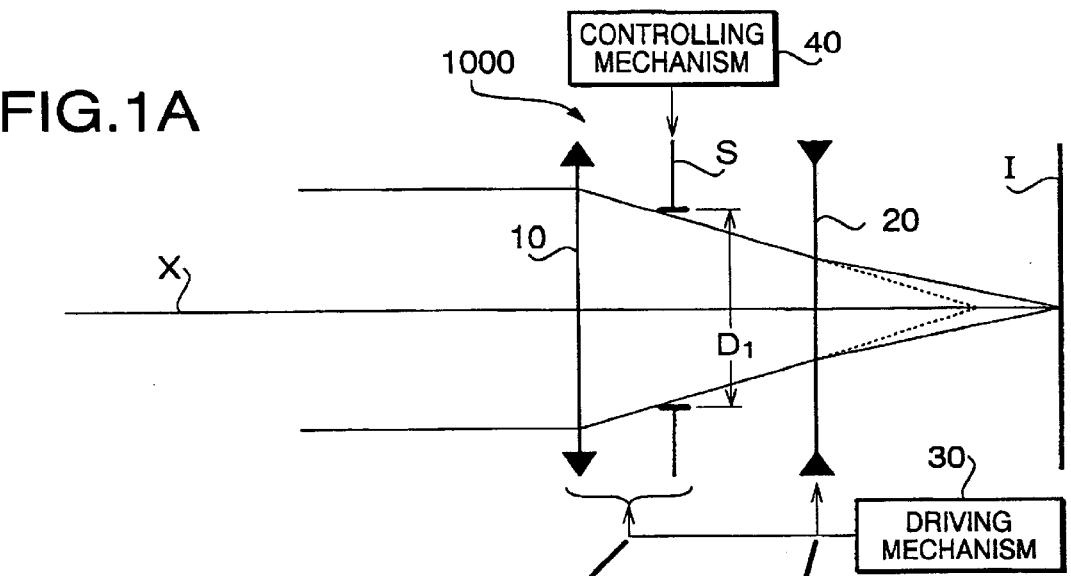
FIG.1A
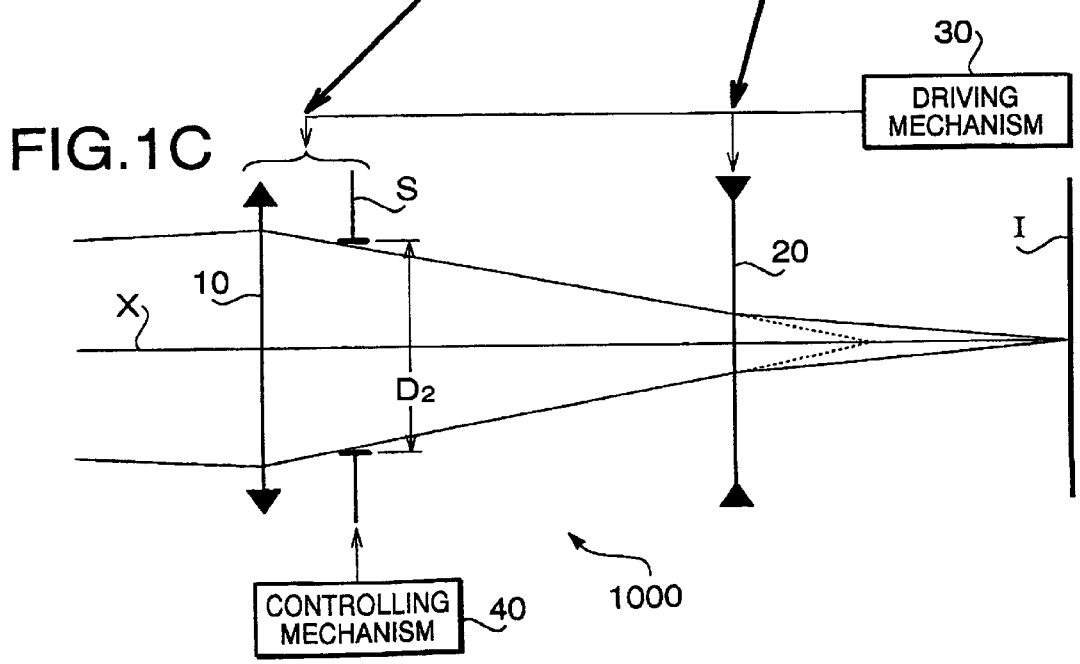
FIG.1B
FIG.1C

MACRO LENS SYSTEM

BACKGROUND OF THE INVENTION

The present invention relates to a macro lens system for a camera, particularly, for an auto-focus camera.

As an auto-focus (automatic focus) system, a TTL (Through The Lens) auto-focus system, which utilizes light passed through a photographing lens of a camera for an auto-focus operation, has been known. The TTL auto-focus system requires that the camera is provided with a lens having a small F-number. Generally, if an effective F-number at a full-open aperture is larger than "7", light amount received by a sensor of the auto-focus system is too small for reliable operation.

As one of photographing lenses, a macro lens is known. In the macro lens, when the focusible range thereof is broadened, the effective F-number thereof varies within a relatively wide range. That is, the effective F-number is maximum when the lens is set to focus on an object at the minimum object distance, and the effective F-number becomes minimum when the lens is set to focus on an object at the infinity. The maximum F-number of the macro lens may exceed the upper limit required by the auto-focus system if a reasonable lens size is to be maintained.

In an example of a conventional macro lens for a middle or large format camera, the minimum F-number is "4" at infinity and the maximum F-number is "8" at the minimum object distance. This maximum F-number is too large for the auto-focus system to operate.

If the conventional macro lens is designed so that the maximum F-number is approximately equal to "6", the minimum F-number becomes approximately "3". Although such a macro lens allows operation of the auto-focus system even at the minimum object distance, the size of the lens (i.e., diameter and length) will become too large to use practically. It is because, at a given focal length, the smaller the minimum F-number is, the larger the lens diameter becomes to keep the light amount, and the larger the number of lenses are required to reduce aberrations.

SUMMARY OF THE INVENTION

It is therefore an object of the present invention to provide an improved macro lens system that enables an auto-focus system to operate even when the lens is set to focus on an object at the minimum object distance, with maintaining a reasonable lens size.

According to an aspect of the invention, there is provided a macro lens system, of which a focusing state is adjustable between an infinite focusing state where the macro lens system focuses on an object at infinity and a close focusing state where the macro lens system focuses on an object at the minimum object distance. The macro lens system is provided with a focusing lens group that moves along an optical axis between an infinite focusing position which is close to an image plane at the infinite focusing state and a close focusing position which is far from the image plane at the close focusing state; an aperture whose full-opening diameter is changeable; and a controller for controlling the aperture so that the full-opening diameter increases in response to movement of the focusing lens group toward the object side.

With this construction, the full-opening diameter of the aperture can be controlled such that the opening at the infinite focusing state is smaller than at the close focusing state. Thus, the F-number at the infinite focusing state will not become too small, which allows an auto-focus system to operate at any focusing states of the lens, without increasing the lens size.

The focusing lens group may be provided with a first lens group having a positive power and a second lens group having a negative power, the first and second lens groups being driven to move along the optical axis in the same direction, the first and second lens groups being located at positions closer to an object when the object is closer, a distance between the first and second lens groups being greater as an object is closer; an aperture provided between the first and second lens groups, an full-opening diameter of the aperture being changeable; and a controller that increases the full-opening diameter of the aperture as the first and second lens groups are moved towards the object.

It is preferable that the macro lens system satisfies the following conditions:

$$0.5 < Fe/\{F(1-Mc)\} < 0.9 \quad (1),$$

$$Fe < 7 \quad (2),$$

where,

F is an effective F-number at the infinite focusing state;

Fe is an effective F-number in the close focusing state; and

Mc is a lateral magnification in the close focusing state.

Further, condition (3) is preferably satisfied:

$$0 < X2/X1 < 0.5 \quad (3),$$

where,

X1 is a total moving amount of the first lens group or the entire focusing range; and X2 is a total moving amount of the second lens group for the entire focusing range.

The aperture may move along the optical axis during focusing together with the first lens group.

According to a further aspect of the invention, there is provided a macro lens system of which a focusing state is adjustable between an infinite focusing state where the macro lens system focuses on an object at infinity and a close focusing state where the macro lens system focuses on an object at the minimum object distance. The macro lens system is provided with: a focusing lens group that moves along an optical axis of the macro lens system, the focusing lens group being located at an infinite focusing position in the infinite focusing state, and at a close focusing position in the close focusing state; an aperture whose full-opening diameter is changeable; and a controller for varying the full-opening diameter of the aperture so that conditions (1) and (2) are satisfied:

$$0.5 < Fe/\{F(1-Mc)\} < 0.9 \quad (1),$$

$$Fe < 7 \quad (2),$$

where,

F is an effective F-number when the macro lens system is in the infinite focusing state;

Fe is an effective F-number in the close focusing state; and

Mc is a lateral magnification in the close focusing state.

BRIEF DESCRIPTION OF THE ACCOMPANYING DRAWINGS

FIGS. 1A through 1C show an optical construction of a macro lens system of the present invention and loci of movement of the lenses;

DETAILED DESCRIPTION OF THE PREFERRED EMBODIMENTS

Figure 2:
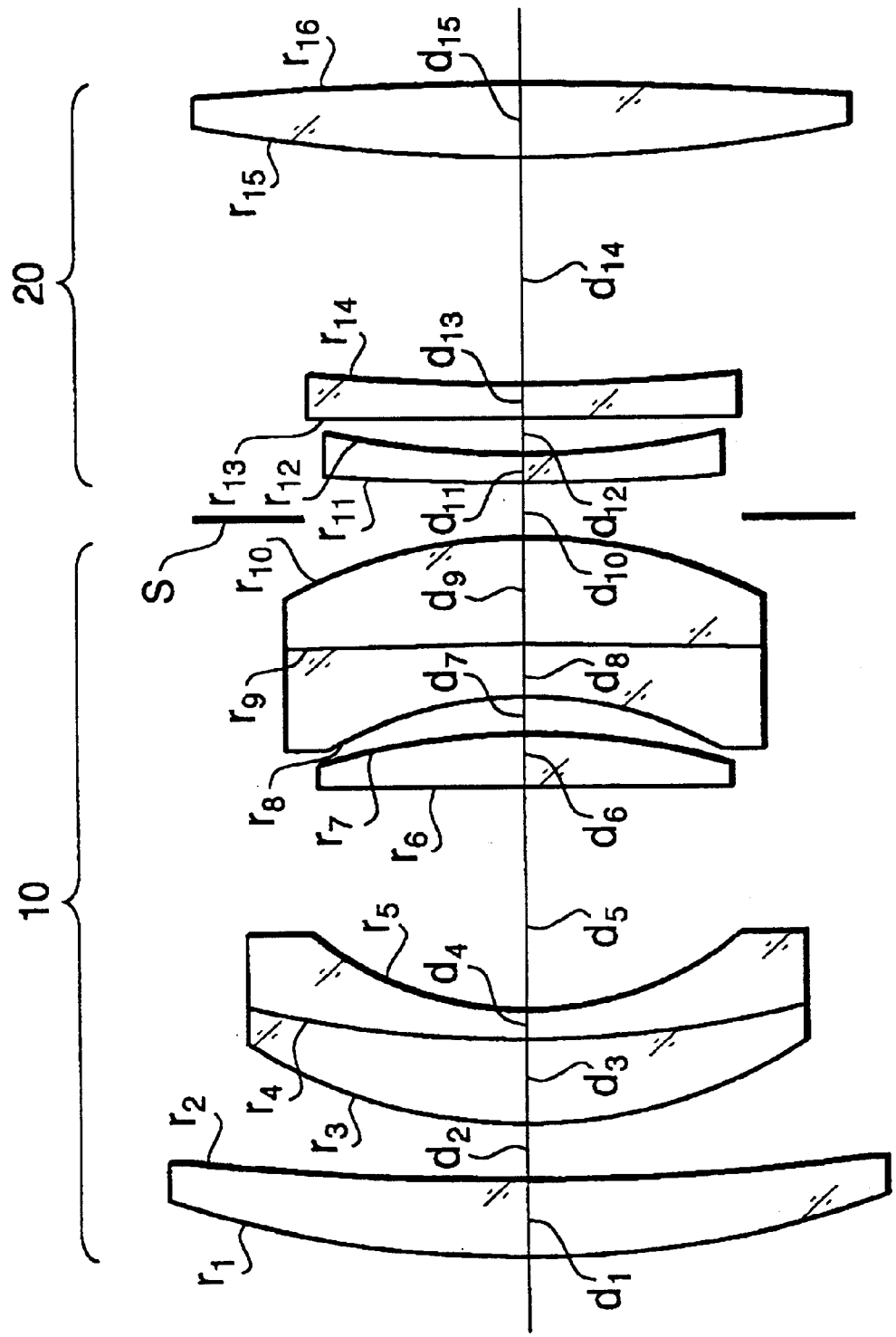
FIG. 2 shows a macro lens system according to a first embodiment at an infinite focusing state.
Figure 3:
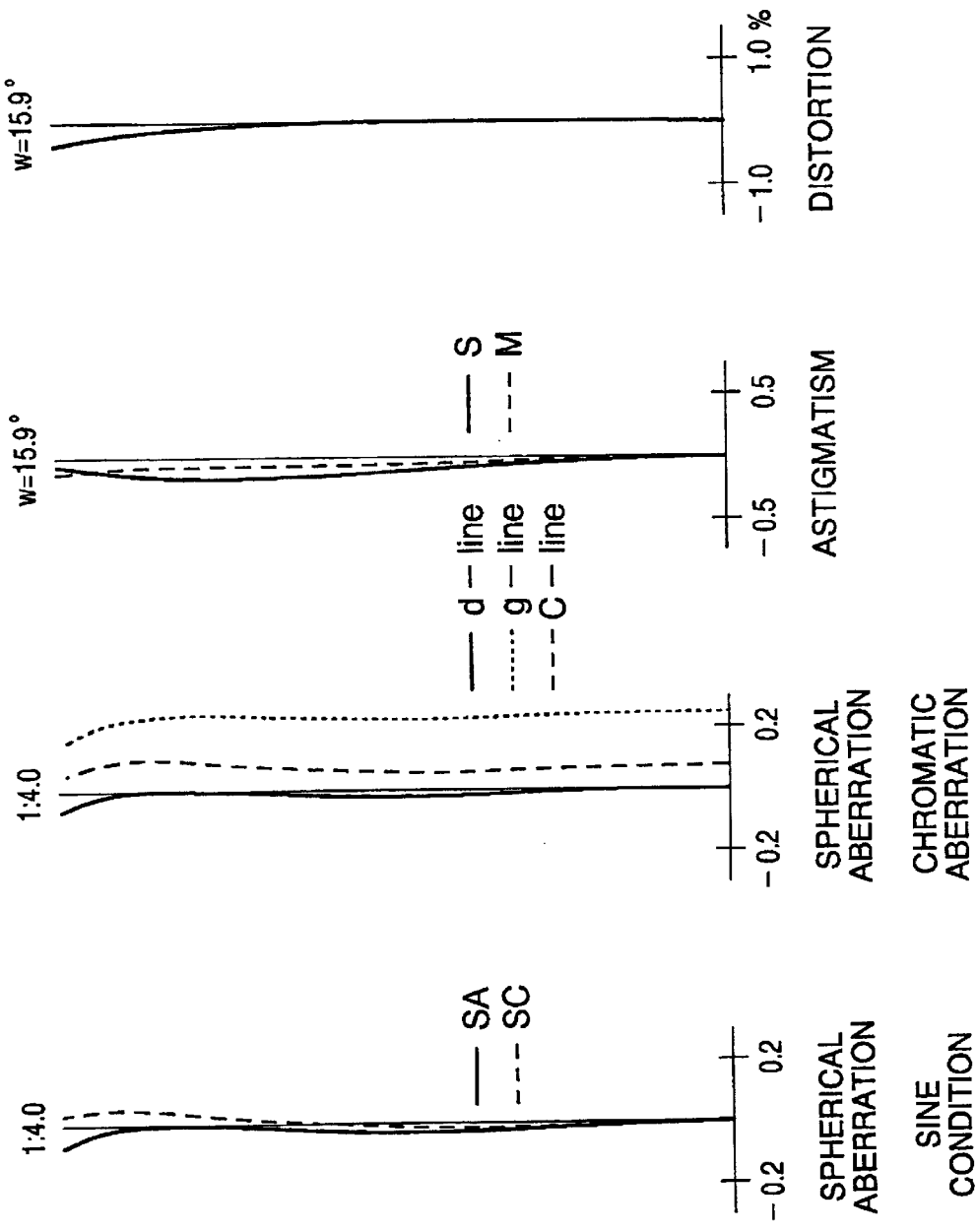
FIGS. 3A–3D show various aberrations of the macro lens system shown in FIG. 2 at the infinite focusing state.

FIGS. 1A and 1C show a configuration of a macro lens system 1000 according to the invention, and FIG. 1B shows loci of the lenses. The macro lens system 1000 includes a first lens group 10 that has a positive refractive power, an aperture S, and a second lens group 20 that has a negative refractive power arranged in the order from an object side (i.e., from the left-hand in FIGS. 1A and 1C).

The macro lens system 1000 further includes a driving mechanism 30 to move the lens groups 10 and 20 along an optical axis X for focusing, and a controlling mechanism 40 to change a full-opening diameter of the aperture S in response to an operation of the driving mechanism 30. The aperture S moves along the optical axis X in association with the first lens group 10.

FIG. 1A shows an infinite focusing state of the macro lens system currently focus on an object at infinity, where the first lens group 10 is close to an image plane I. A film of a camera is positioned at this image plane I. FIG. 1C shows a close focusing state focused on an object at the minimum object distance where the first lens group 10 is far from the image plane I. Lateral magnification M of the macro lens system at the close focusing state is equal to life-size (M=−1).

The driving mechanism 30 drives the first lens group 10 toward the object side as the object distance is smaller and drives the second lens group in the same direction but by a smaller amount as shown in FIG. 1B. Thus, the distance between the first and second lens groups 10 and 20 increases with movement of the lens groups 10 and 20 toward the object side.

The controlling mechanism 40 changes the full-opening diameter of the aperture S such that, when the lens groups 10 and 20 move toward the object side, the full-opening diameter increases. The full-opening diameter of the aperture S is D1 when the macro lens is in the infinite focusing state. In the embodiment, the full-opening diameter continuously increases as the aperture S moves to the object side, and then the full-opening diameter becomes D2 when the macro lens system is in the close focusing state. It should be noted that, although the full-opening diameter changes continuously in accordance with the movement of the lens groups 10 and 20, it can be modified such that the full-opening diameter of the aperture may change stepwisely.

The adjustment of the full-opening diameter of the aperture is effective to make sufficient amount of light incident on the auto-focus sensor without increasing the lens size. That is, the F-number at the infinite focusing state is not so small (approximately "4"), it is not required a larger size lens, while allowing a sufficient F-number (approximately "6") at the close focusing state.

Figure 14:
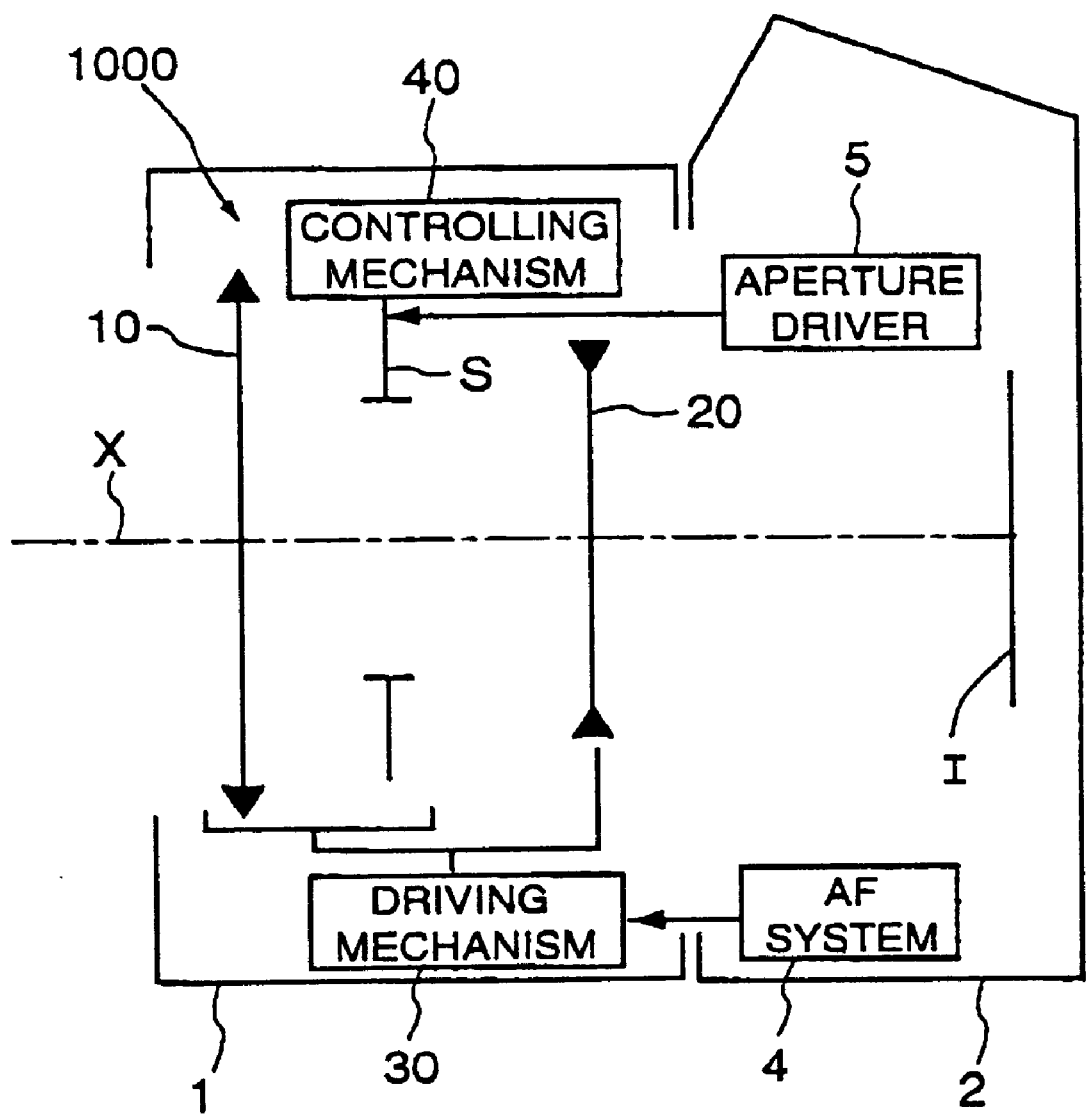
FIG. 14 shows a block diagram of a camera that includes a lens unit and a camera body.

FIG. 14 shows a auto-focus single lens reflex camera of which lens unit employs the macro lens system 1000 described above. The camera comprises a lens unit 1 and a camera body 2.

The lens groups 10 and 20 are held in the lens unit 1. The driving mechanism 30 is a well-known cam mechanism that functions, for example, such that the lens groups 10 and 20 moves along the optical axis X.

An auto-focus (AF) system 4 is provided in a camera body 2. Specifically, the auto-focus system 4 is provided with a sensor to receive light directed from an object and passed through the first and second lens groups 10 and 20 and a motor that is engaged with the driving mechanism 30 to drive the driving mechanism 30 in accordance with the detected signal output by the sensor.

The aperture S of the embodiment is under the two different controls. The first one is a well-known control from the camera body 2, and the second one is the function of the controlling mechanism 40 that is a characteristics of the invention.

In general, an interchangeable lens unit for a single lens reflex camera is provided with a spring that forces the aperture to be minimize the opening diameter and a drive pin that changes the opening diameter of the aperture.

The lens unit 1 of the embodiment also includes the spring and the drive pin. The camera body 2 is provided with an aperture driver 5 that includes a drive lever engaged with the drive pin when the lens unit 1 is attached to the camera body 2, and a motor to control the drive lever. The drive lever usually pushes the drive pin to fully open the aperture S against the spring force. As a result, the aperture S is fully opened when the AF system 4 detects the focusing state. At the time of shutter-release, the drive lever moves to a position to obtain a predetermined exposure value. After the shutter-release, the drive lever returns back the position where the aperture is fully opened.

The control by the aperture driver 5 in the camera body 2 corresponds the first control described above.

In addition to the first control, the aperture S of the embodiment is controlled by the controlling mechanism 40 provided in the lens unit 1. The controlling mechanism 40 is a cam mechanism that limits the full-opening diameter in accordance with the operation of the driving mechanism 30.

According to the embodiment, the macro lens system satisfies the following conditions:

$$0.5 < Fe/\{F(1-Mc)\} < 0.9 \qquad (1)$$

$$Fe < 7 \qquad (2)$$

$$0 < X2/X1 < 0.5 \qquad (3)$$

where,

F is an effective F-number when the lens is set in the infinite focusing state;

Fe is an effective F-number when the lens is set in the close focusing state;

Mc is lateral magnification when the lens is set in the close focusing state;

X1 is a total moving amount of the first lens group 10 for the entire focusing range; and X2 is a total moving amount of the second lens group 20 for the entire focusing range.

Condition (1) defines a ratio of F-number at the close focusing state to F-number at the infinite focusing state. If condition (1) is satisfied, the F-number varies within a relatively small range when the status of the lens changes between the infinite focusing state and the close focusing state. If the ratio is larger than the upper limit, the varying range of F-number will be too large. That is, even if the F-number at the infinite focusing state is made small, the F-number at the close focusing state becomes too large to keep enough light amount for the normal operation of the auto-focus system. If the ratio is smaller than the lower limit, a larger lens will be required for the first lens group 10.

Condition (2) directly defines the F-number at the close focusing state. In order to allow a sufficient amount of light to be incident on the auto-focus system at the close focusing state, condition (2) should be satisfied.

Condition (3) defines a ratio of the total moving amount of the second lens group 20 to that of the first lens group 10. Satisfaction of condition (3) provides a well-balanced lens in either size or performance. When the ratio exceeds the upper limit, the total moving amounts of the first and second lens groups for the entire focusing range becomes larger, which requires a larger diameter and a longer length of the lens system to allow sufficient amount of light to be incident on the auto-focus system. On the other hand, when the ratio is lower than the lower limit, the second lens group 20 moves an opposite direction to the first lens group 10 for focusing. In such a condition, movement of a lens group may prevent movement of the other lens when they are moved towards positions for the infinite focusing state, a longer back-focus may become necessary, and the distance between the lens groups becomes larger at the close focusing state. Thus, it is preferable that the ratio is greater than the lower limit.

Next, numerical embodiments will be described with reference to FIGS. 2 through 13.

[First Embodiment]

Figure 4:
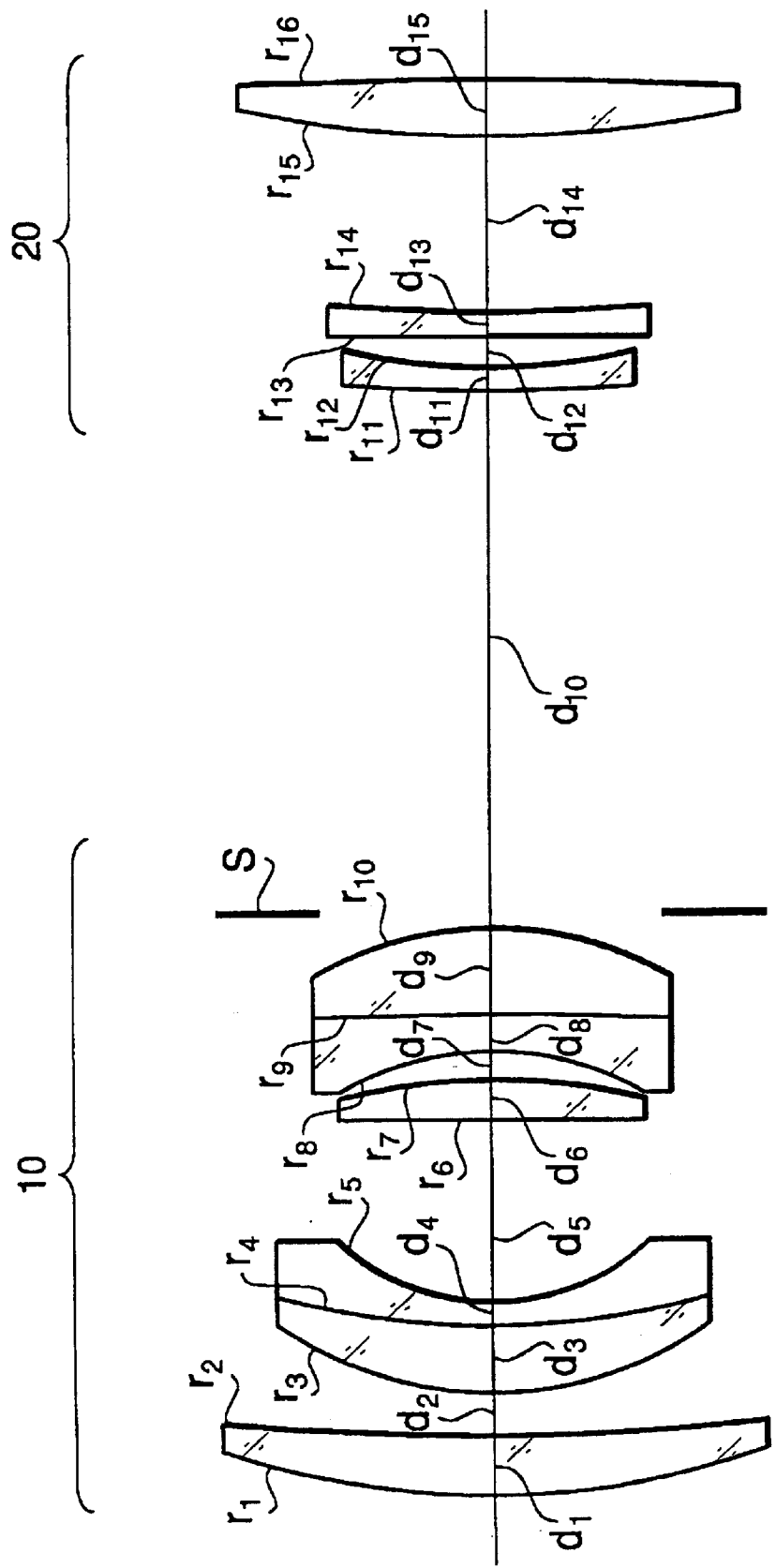
FIG. 4 shows the macro lens system according to the first embodiment at a close focusing state.
Figure 5:
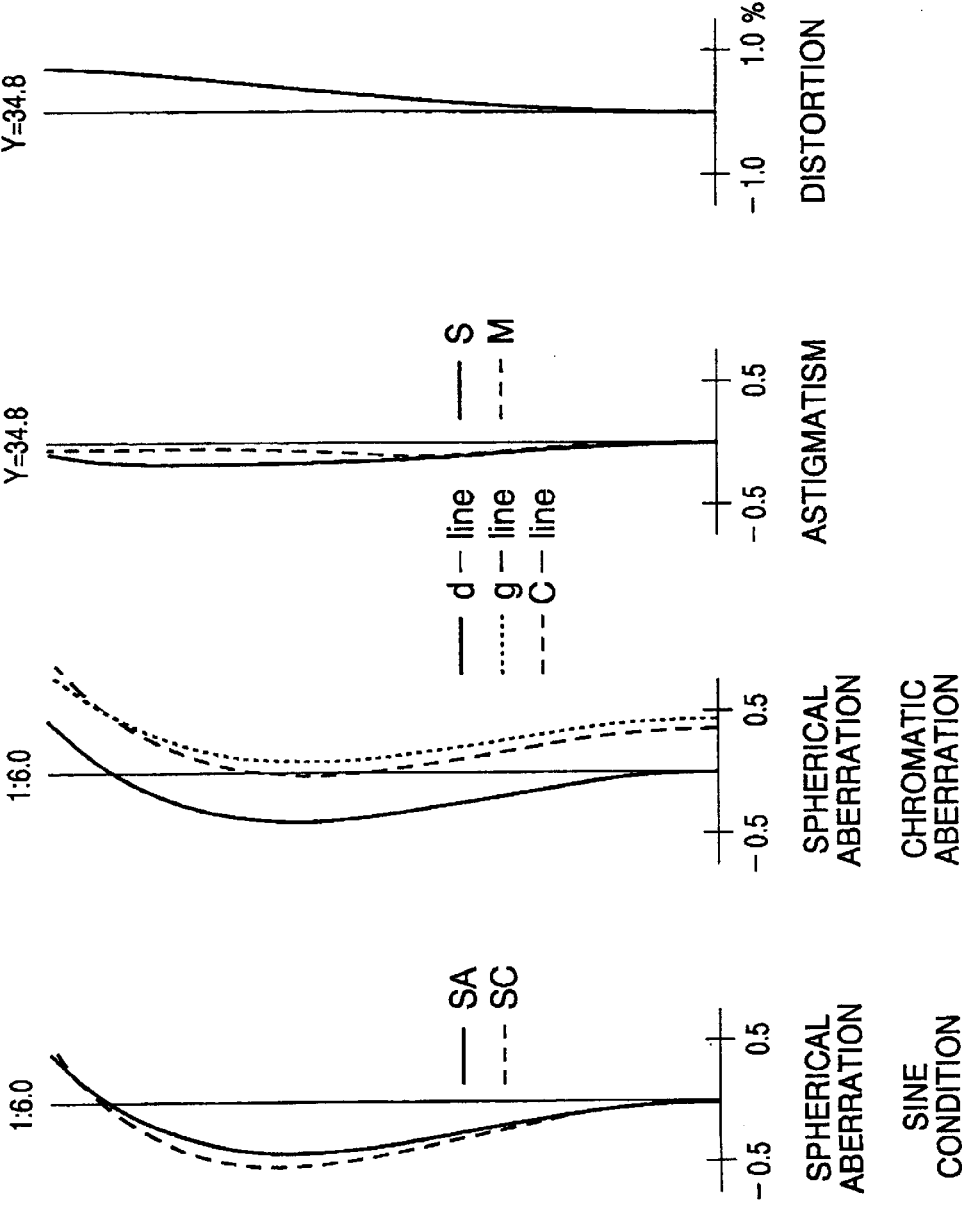
FIGS. 5A–5D show various aberrations of the macro lens system shown in FIG. 4 at the close focusing state.

FIGS. 2 and 4 show the numerical constructions of the macro lens system according to a first embodiment when set in the infinite focusing state and in the close focusing state, respectively. The macro lens system includes the first lens group 10, the aperture stop S and the second lens group 20.

The numerical construction of the first embodiment is indicated in TABLE 1. In the table (and also in Table of other embodiments), $F_{NO}$ denotes the F-number of the macro lens, f (mm) denotes the focal length of the macro lens, M denotes a lateral magnification, fB (mm) denotes a back-focus (a distance between the last surface and the image plane), r (mm) denotes a radius of curvature of a surface, d (mm) denotes a distance between adjacent surfaces along the optical axis, N denotes a refractive index at a wavelength of 588 nm (d-line) and vd denotes an Abbe's number. The values of the F-number, the focal length, the magnification and the back-focus vary in accordance with the focusing movement of the lens groups 10 and 20.

TABLE 1

$F_{NO}$ = 1:4.0 – 1:6.0  f = 123.03 – 104.87
M = 0 – –1.000  $f_B$ = 76.00 – 91.75

| Surface Number | R | D | N | vd |
|---|---|---|---|---|
| 1 | 65.353 | 5.41 | 1.78590 | 44.2 |
| 2 | 176.020 | 4.02 | — | — |
| 3 | 31.062 | 6.23 | 1.61800 | 63.4 |
| 4 | 63.828 | 2.10 | 1.54072 | 47.2 |
| 5 | 19.647 | 16.97 | — | — |
| 6 | –1007.822 | 3.67 | 1.48749 | 70.2 |
| 7 | –42.408 | 2.76 | — | — |
| 8 | –23.979 | 3.55 | 1.64769 | 33.8 |
| 9 | –697.904 | 8.30 | 1.73400 | 51.5 |
| 10 | –28.071 | 1.50 | — | — |
| Aperture | | 2.50–49.75 | | |
| 11 | 246.750 | 2.10 | 1.77250 | 49.6 |
| 12 | 53.994 | 2.84 | — | — |
| 13 | 6417.361 | 2.30 | 1.67790 | 55.3 |
| 14 | 179.504 | 16.32 | — | — |
| 15 | 99.063 | 5.00 | 1.78590 | 44.2 |
| 16 | –448.262 | — | — | — |

The full-opening diameter of the aperture S continuously varies according to the change of the lateral magnification M. Examples of the full-opening diameter of the aperture S are indicated in TABLE 2.

TABLE 2

| M | Full-Opening Diameter of Aperture |
|---|---|
| 0 | 11.45 (mm) *Minimum diameter |
| –0.5 | 13.15 (mm) |
| –1.0 | 14.73 (mm) *Maximum diameter |

FIGS. 3A–3D show third order aberrations of the macro lens system at the infinite focusing state according to the first embodiment. FIG. 3A shows a spherical aberration SA and a sine condition SC, FIG. 3B shows chromatic aberration represented by spherical aberrations for d, g, c-lines, FIG. 3C shows an astigmatism (S: Sagittal, M: Meridional) and FIG. 3D shows distortion. The vertical axis represents F-number in FIGS. 3A and 3B, a half view angle w (degree) in FIGS. 3C and 3D. Unit of the horizontal axis is "mm" in each of FIGS. 3A through 3C and "percent (%)" in FIG. 3D.

FIGS. 5A–5D show third order aberrations of the macro lens system at the close focusing state according to the first embodiment. Each of the vertical axes of FIGS. 5C and 5D represents a distance Y (mm) from an optical axis on an image plane.

[Second Embodiment]

Figure 6:
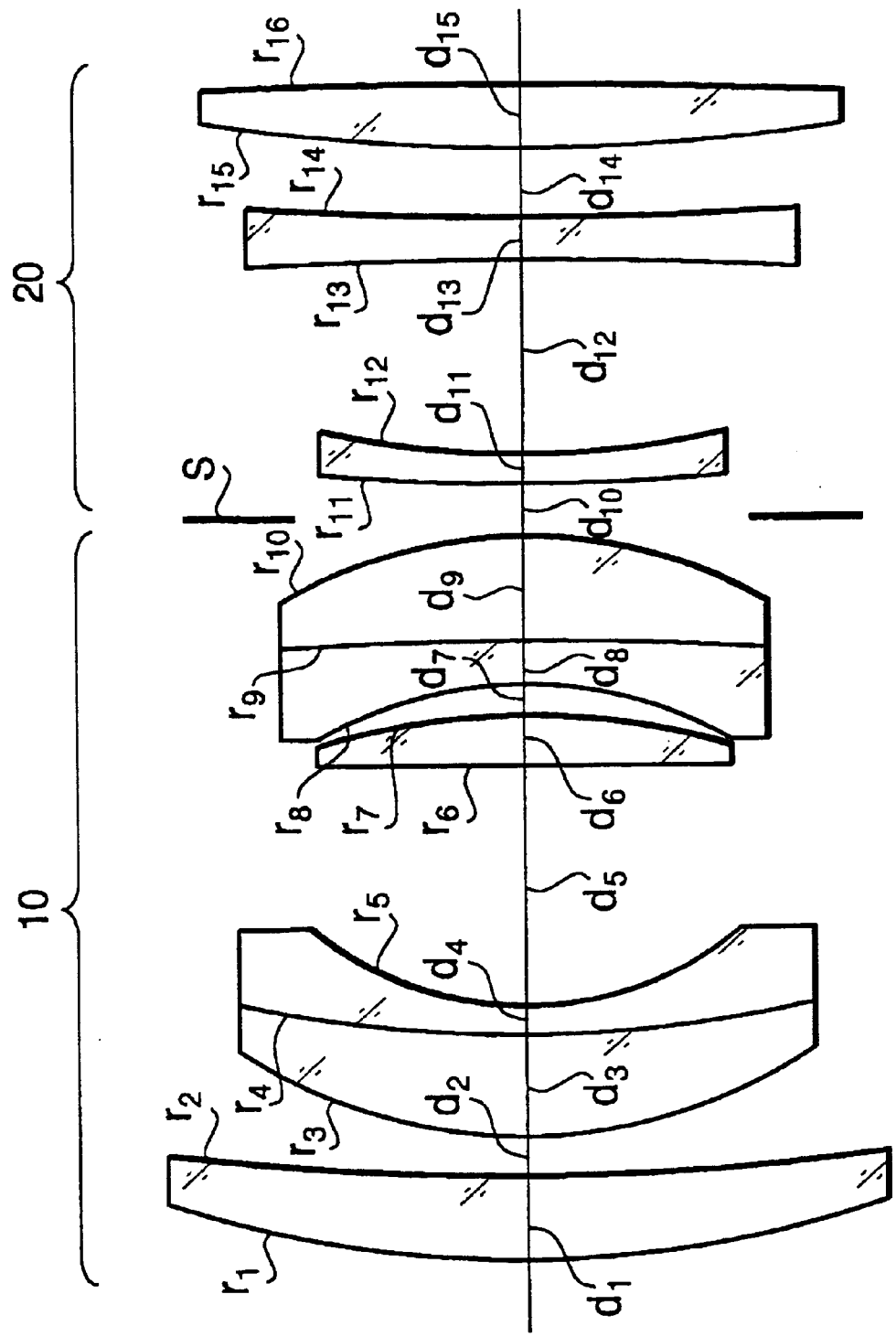
FIG. 6 shows a macro lens system according to a second embodiment at the infinite focusing state.
Figure 8:
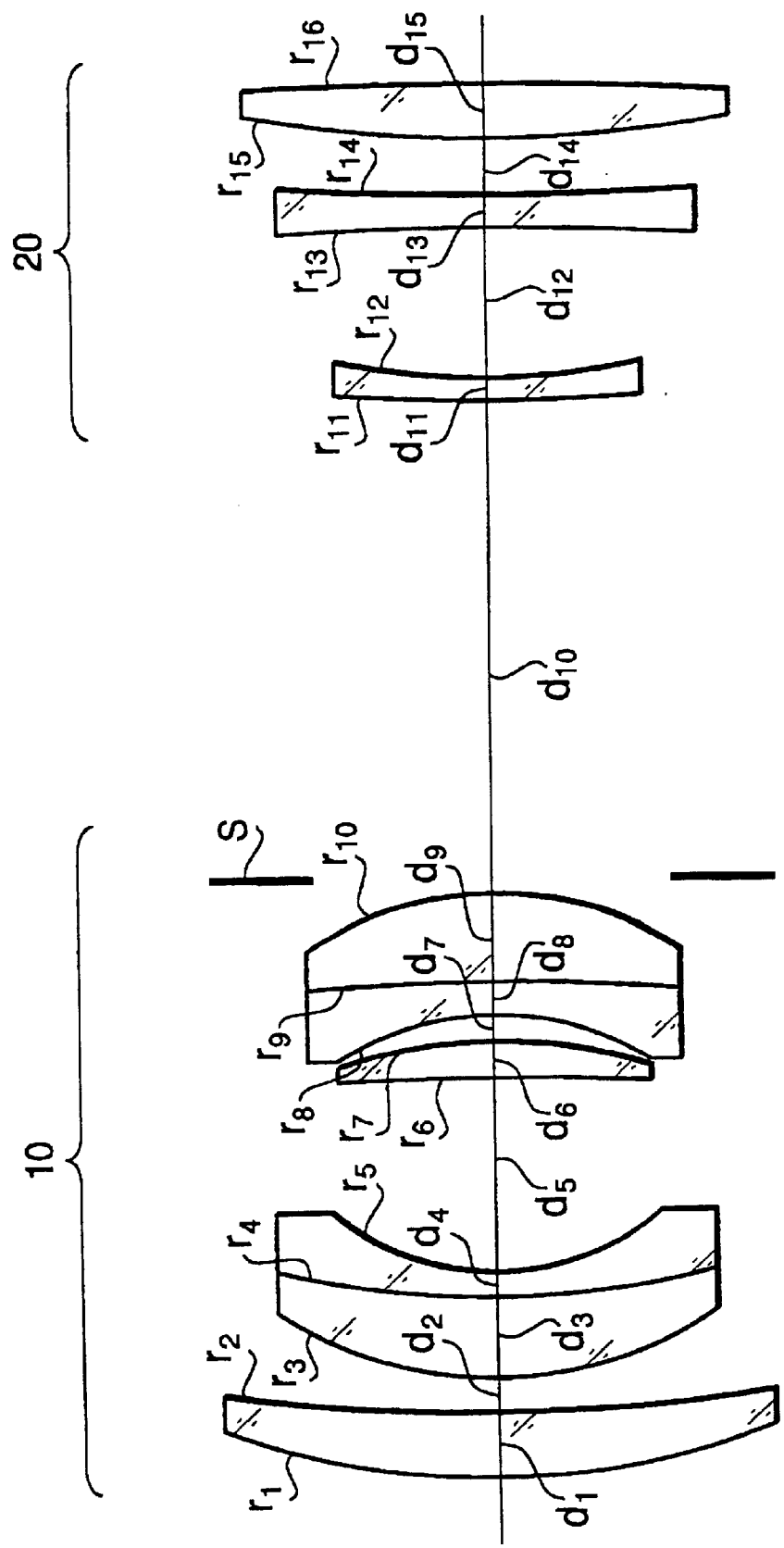
FIG. 8 shows the macro lens system according to the second embodiment at the close focusing state.

FIGS. 6 and 8 show the constructions of the macro lens system according to the second embodiment at the infinite focusing state and at the close focusing state, respectively. The numerical construction of the second embodiment is indicated in TABLE 3. Examples of the full-opening diameter of the aperture S is indicated in TABLE 4.

TABLE 3

$F_{NO}$ = 1:4.0 – 1:6.1  f = 123.03 – 106.78
M = 0 – –1.000  $f_B$ = 73.04 – 102.16

| Surface Number | R | D | N | vd |
|---|---|---|---|---|
| 1 | 65.772 | 6.00 | 1.78590 | 44.2 |
| 2 | 157.715 | 3.15 | — | — |
| 3 | 31.485 | 7.43 | 1.61800 | 63.4 |
| 4 | 78.328 | 2.10 | 1.54072 | 47.2 |

TABLE 3-continued

| | | | | |
|---|---|---|---|---|
| 5 | 19.348 | 18.08 | — | — |
| 6 | −568.389 | 3.56 | 1.48749 | 70.2 |
| 7 | −40.259 | 2.44 | — | — |
| 8 | −23.313 | 3.18 | 1.64769 | 33.8 |
| 9 | −212.213 | 8.18 | 1.73400 | 51.5 |
| 10 | −27.323 | 1.50 | — | — |
| Aperture | | 2.50–46.25 | | |
| 11 | 175.681 | 2.10 | 1.77250 | 49.6 |
| 12 | 53.550 | 14.50 | — | — |
| 13 | −288.380 | 3.00 | 1.58913 | 61.2 |
| 14 | 288.380 | 5.18 | — | — |
| 15 | 102.818 | 4.87 | 1.78590 | 44.2 |
| 16 | −356.902 | — | — | — |

TABLE 4

| M | Full-Opening Diameter of Aperture |
|---|---|
| 0 | 11.55 (mm) *Minimum diameter |
| −0.5 | 13.53 (mm) |
| −1.0 | 15.03 (mm) *Maximum diameter |

Figure 7:
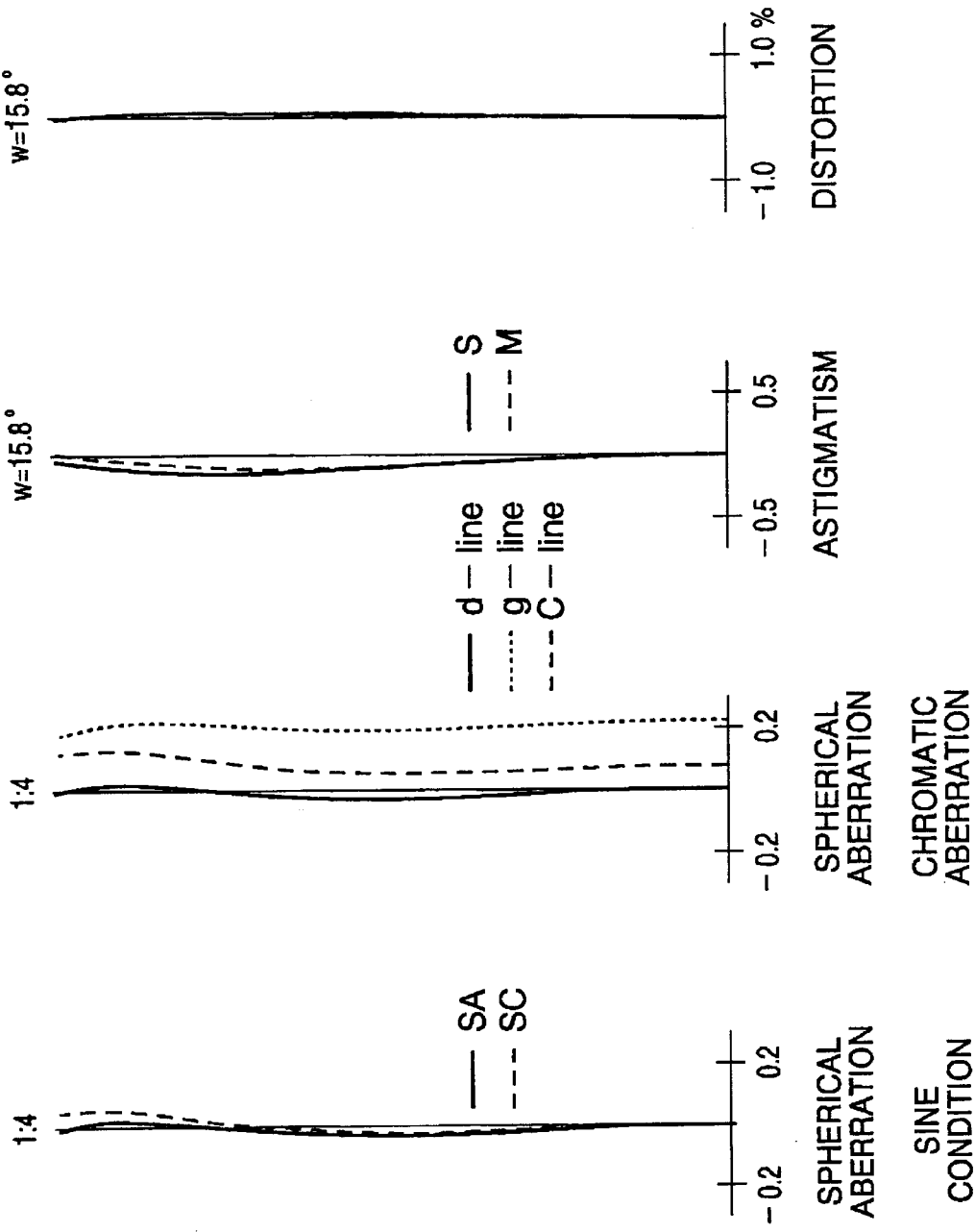
FIGS. 7A–7D show various aberrations of the macro lens system shown in FIG. 6 at the infinite focusing state.
Figure 9:
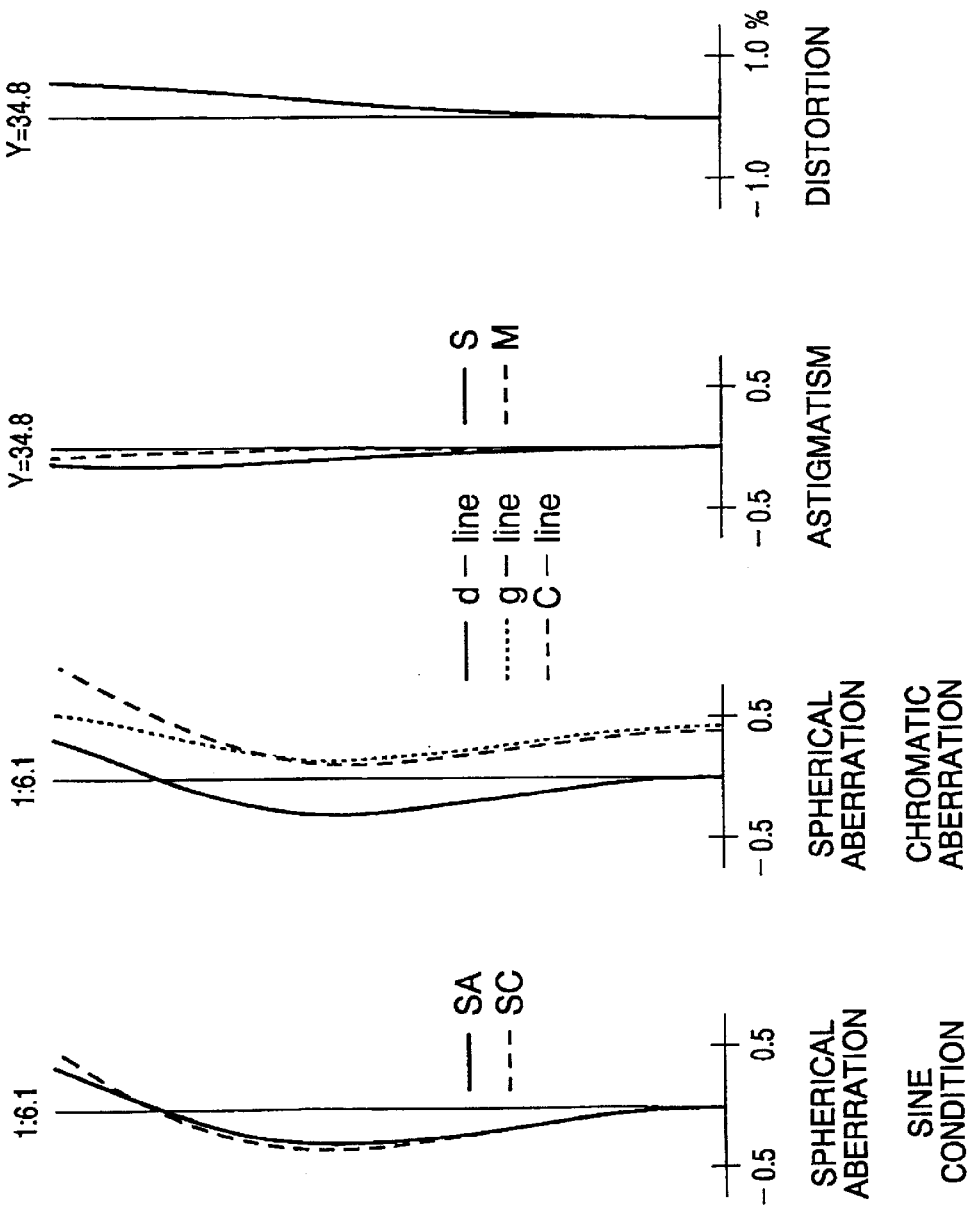
FIGS. 9A–9D show various aberrations of the macro lens system shown in FIG. 8 at the close focusing state.

FIGS. 7 and 9 show third order aberrations of the macro lens system according to the second embodiment at the infinite focusing state and at the close focusing state, respectively.

[Third Embodiment]

Figure 10:
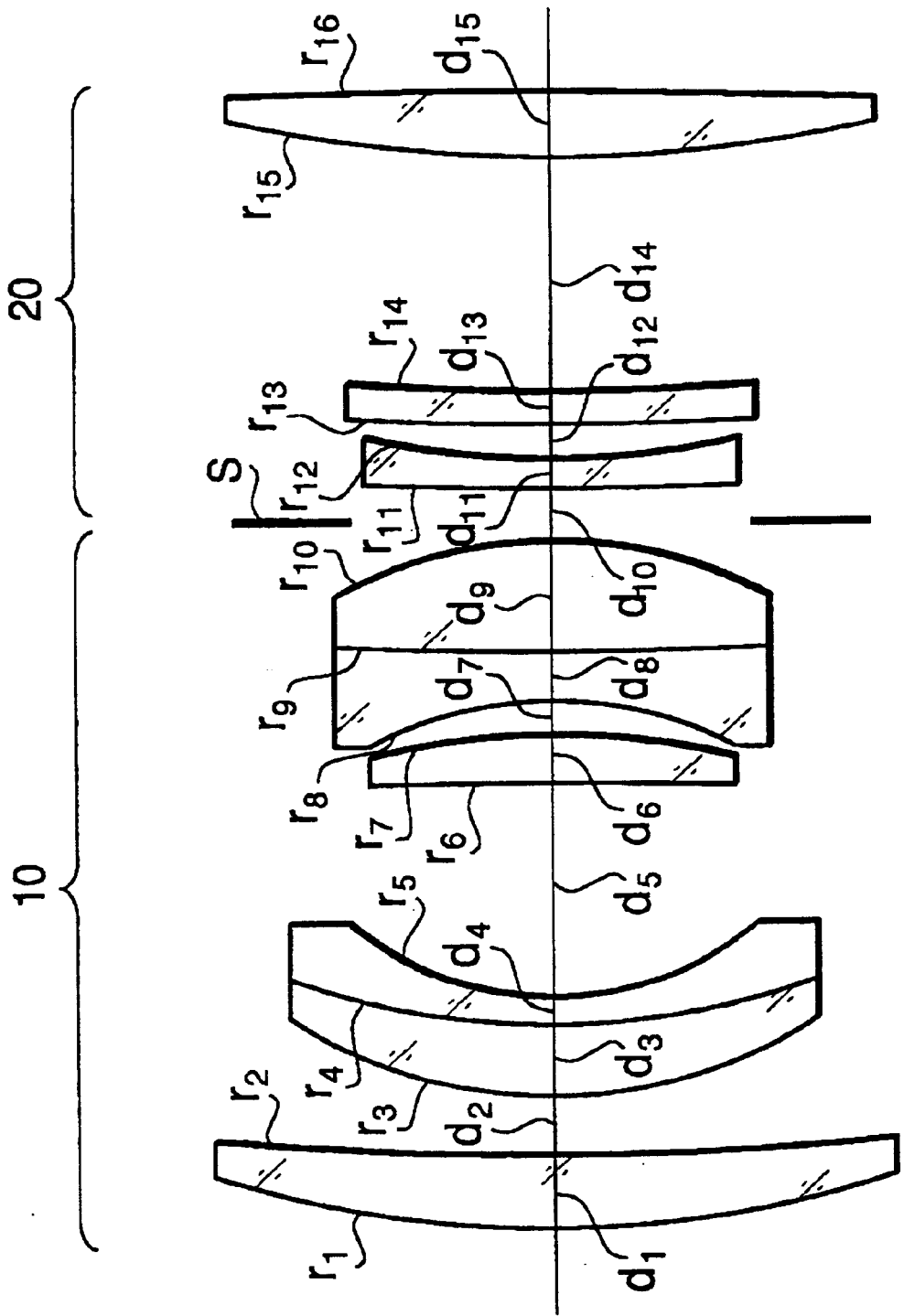
FIG. 10 shows a macro lens system according to a third embodiment at the infinite focusing state.
Figure 12:
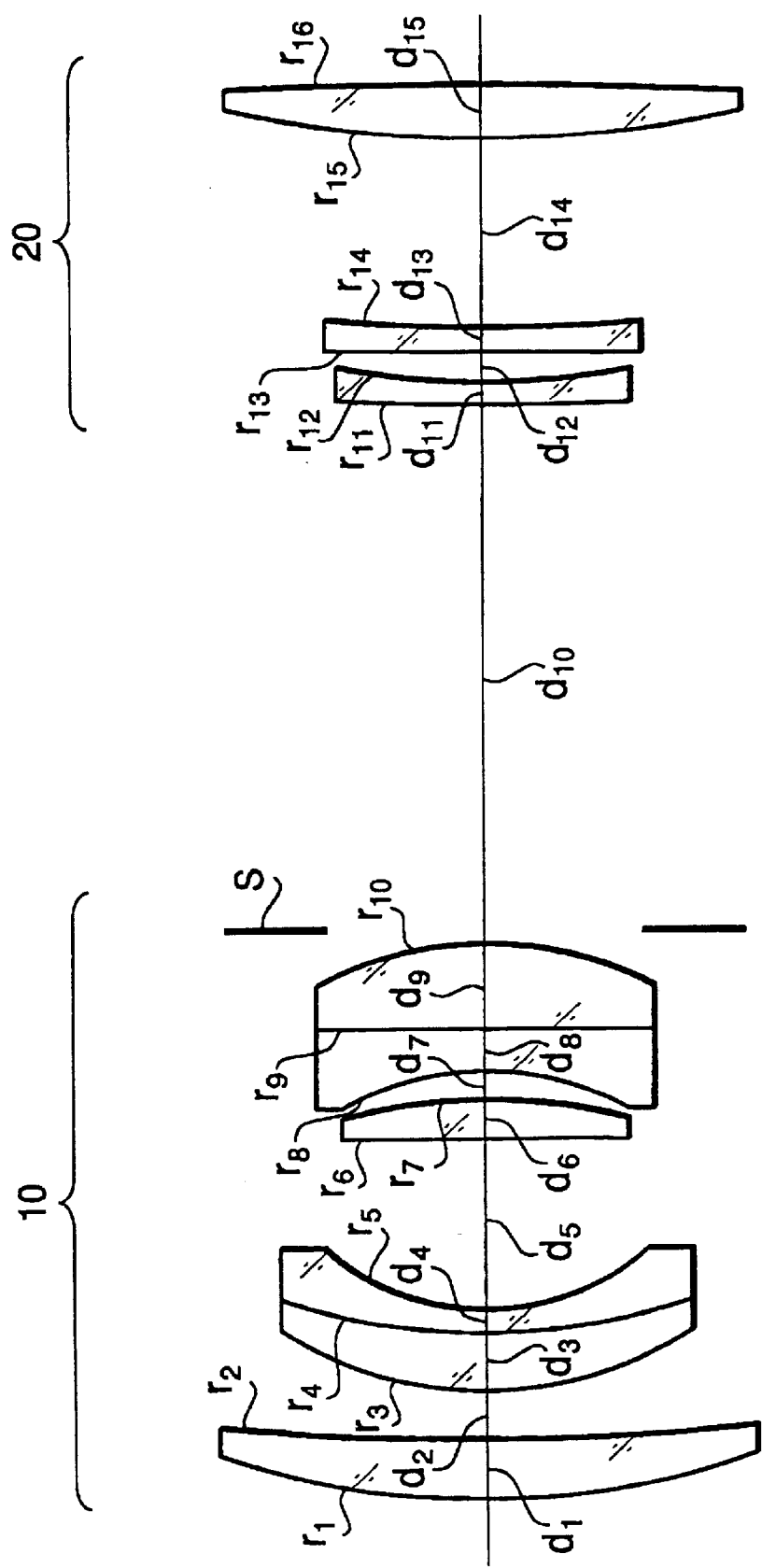
FIG. 12 shows the macro lens system according to the third embodiment at the close focusing state.

FIGS. 10 and 12 show the concrete constructions of the macro lens system of the third embodiment at the infinite focusing state and at the close focusing state respectively. The numerical construction of the third embodiment is described in TABLE 5. The variation of the full-opening diameter of the aperture S is shown in TABLE 6.

TABLE 5

| $F_{NO}$ = 1:4.0 − 1:6.3 | | f = 123.03 − 104.40 | | |
|---|---|---|---|---|
| M = 0 − −1.000 | | $f_B$ = 76.00 − 86.48 | | |
| Surface Number | R | D | N | vd |
| 1 | 65.462 | 5.43 | 1.78590 | 44.2 |
| 2 | 189.220 | 4.65 | — | — |
| 3 | 30.428 | 5.48 | 1.61800 | 63.4 |
| 4 | 49.668 | 2.10 | 1.54072 | 47.2 |
| 5 | 19.504 | 16.54 | — | — |
| 6 | −759.144 | 3.64 | 1.49424 | 69.5 |
| 7 | −41.767 | 2.68 | — | — |
| 8 | −23.973 | 3.80 | 1.64769 | 33.8 |
| 9 | 1145.602 | 8.30 | 1.73270 | 51.5 |
| 10 | −28.138 | 1.50 | — | — |
| Aperture | | 2.50–50.61 | | |
| 11 | 287.236 | 2.10 | 1.77250 | 49.6 |
| 12 | 55.050 | 2.88 | — | — |
| 13 | 668.032 | 2.30 | 1.63510 | 57.6 |
| 14 | 138.638 | 18.14 | — | — |
| 15 | 98.991 | 5.00 | 1.78590 | 44.2 |
| 16 | −476.661 | — | — | — |

TABLE 6

| M | Full-Opening Diameter of Aperture |
|---|---|
| 0 | 11.55 (mm) *Minimum diameter |
| −0.5 | 13.11 (mm) |
| −1.0 | 13.90 (mm) *Maximum diameter |

Figure 11:
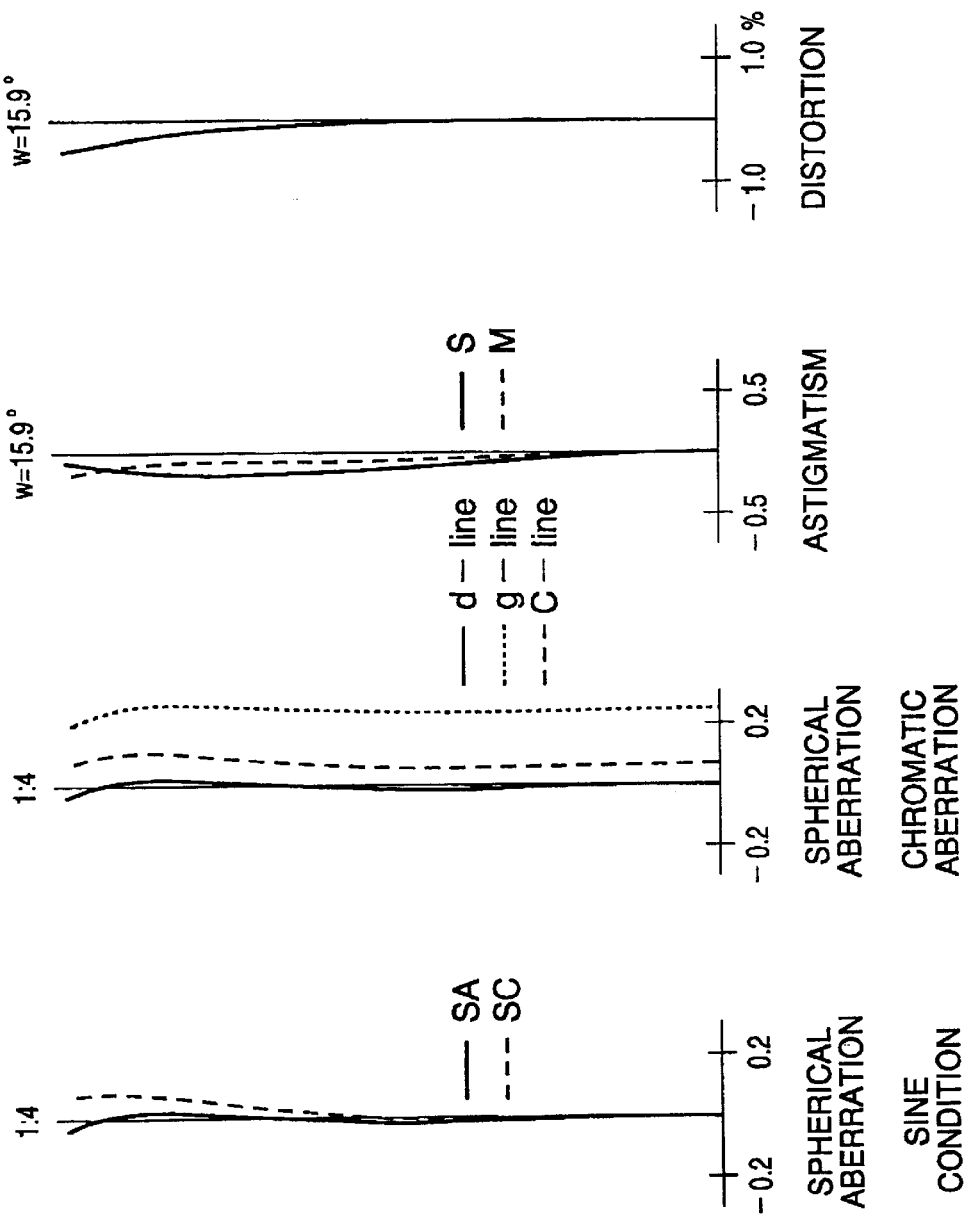
FIGS. 11A–11D show various aberrations of the macro lens system shown in FIG. 10 at the infinite focusing state.
Figure 13:
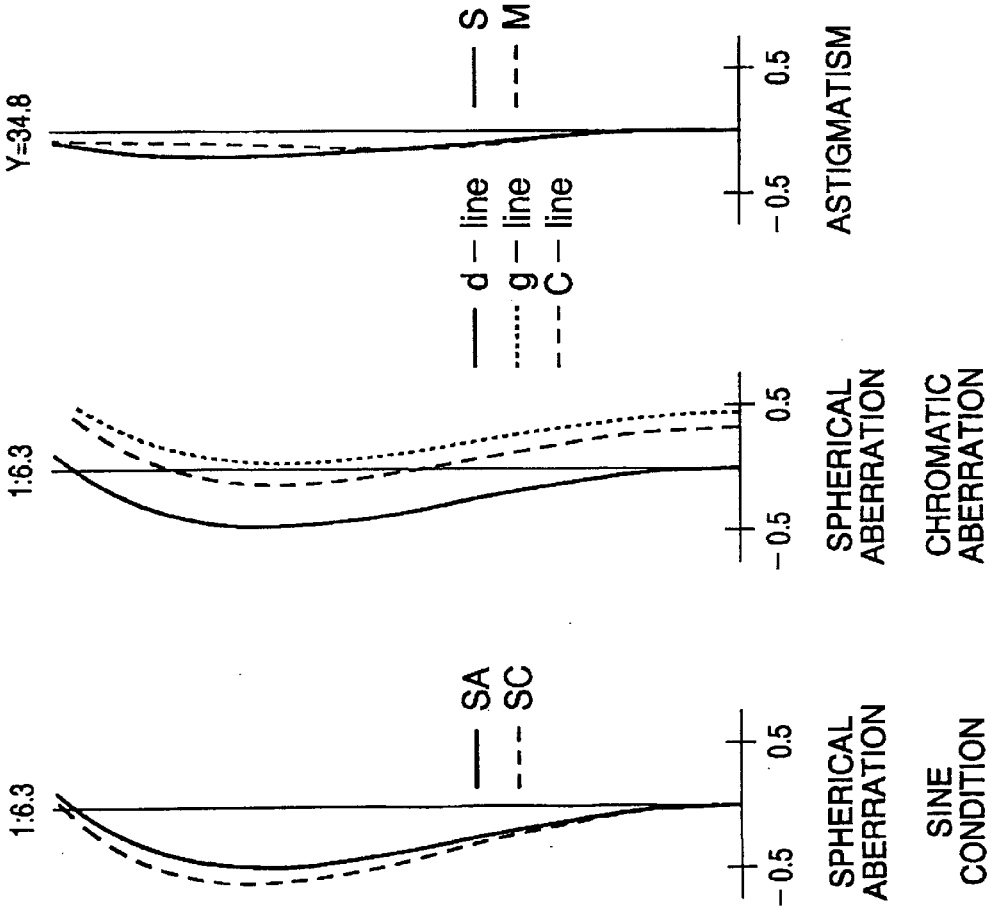
FIGS. 13A–13D show various aberrations of the macro lens system shown in FIG. 12 at the close focusing state.

FIGS. 11 and 13 show third order aberrations of the macro lens system of the third embodiment at the infinite focusing state and at the close focusing state according respectively.

The following TABLE 7 indicates values regarding conditions (1), (2) and (3) for the numerical embodiments.

TABLE 7

| | First embodiment | Second embodiment | Third embodiment |
|---|---|---|---|
| Condition (1) Fe/{F(1 − Mc)} | 0.750 | 0.763 | 0.788 |
| Condition (2) Fe | 6.0 | 6.1 | 6.3 |
| Condition (3) X2/X1 | 0.25 | 0.40 | 0.18 |

Since each of the embodiments satisfies conditions (1), (2) and (3), it is suitable to the camera that provides the TTL auto-focus system.

The present disclosure relates to subject matter contained in Japanese Patent Application No. HEI 9-334418, filed on Dec. 4, 1997, which is expressly incorporated herein by reference in its entirety.

What is claimed is:

1. A macro lens system of which a focusing state is adjustable between an infinite focusing state where said macro lens system focuses on an object at infinity and a close focusing state where said macro lens system focuses on an object at the minimum object distance, said macro lens system comprising:

a focusing lens group that moves along an optical axis between an infinite focusing position which is close to an image plane and a close focusing position which is far from said image plane;

an aperture whose full-opening diameter is changeable; and a controller that controls said aperture so that said full-opening diameter increases in response to movement of said focusing lens group toward the object side;

wherein the following conditions (1) and (2) are satisfied:

$$0.5 < Fe/\{F(1-Mc)\} < 0.9 \qquad (1);$$

and $$Fe < 7 \qquad (2);$$

wherein,

F is an effective F-number at the infinite focusing state;

Fe is an effective F-number at the close focusing state; and

Mc is a lateral magnification at the close focusing state.

2. The macro lens system according to claim 1, wherein said focusing lens group comprises a first lens group having a positive power and a second lens group having a negative power, said first and second lens groups being driven to move along said optical axis in the same direction, said first and second lens groups being located at positions closer to an object when the object is closer, a distance between said first and second lens groups being greater as an object is closer, and wherein said aperture is provided between said first and second lens groups and said controller increases said full-opening diameter of said aperture as said first and second lens groups are moved towards the object.

3. The macro lens system according to claim 2, wherein condition (3) is satisfied:

$$0 < X2/X1 < 0.5 \qquad (3),$$

where,

X1 is a total moving amount of said first lens group for the entire focusing range; and X2 is a total moving amount of said second lens group for the entire focusing range.

4. The macro lens system according to claim 2, wherein said aperture moves along the optical axis during focusing together with said first lens group.

5. The macro lens system according to claim 3, wherein said aperture moves along the optical axis for focusing together with said first lens group.

6. A macro lens system of which a focusing state is adjustable between an infinite focusing state where said macro lens system focuses on an object at infinity and a close focusing state where said macro lens system focuses on an object at the minimum object distance, said macro lens system comprising:

- a focusing lens group that moves along an optical axis of said macro lens system, said focusing lens group being located at an infinite focusing position in said infinite focusing state, and at a close focusing position in said close focusing state;
- an aperture whose full-opening diameter is changeable; and
- a controller for varying said full-opening diameter of said aperture so that conditions (1) and (2) are satisfied:

$$0.5 < Fe/\{F(1-Mc)\} < 0.9 \qquad (1),$$

$$Fe < 7 \qquad (2),$$

where,

F is an effective F-number when said macro lens system is in the infinite focusing state;

Fe is an effective F-number in the close focusing state; and

Mc is a lateral magnification in the close focusing state.

7. The macro lens system according to claim 6, wherein said focusing lens group comprises a first lens group and a second lens group that is located on the image side of said first lens group.

8. The macro lens system according to claim 7, wherein condition (3) is satisfied:

$$0 < X2/X1 < 0.5 \qquad (3),$$

where,

X1 is a total moving amount of said first lens group for the entire focusing range; and X2 is a total moving amount of said second lens group for the entire focusing range.

9. The macro lens according to claim 8, wherein said aperture moves along the optical axis together with said first lens group.

* * * * *